US010962851B1

(12) United States Patent
Ouyang et al.

(10) Patent No.: US 10,962,851 B1
(45) Date of Patent: Mar. 30, 2021

(54) ARRAY SUBSTRATE, DISPLAY PANEL AND DISPLAY DEVICE

(71) Applicant: HON HAI PRECISION INDUSTRY CO., LTD., New Taipei (TW)

(72) Inventors: Shiang-Ruei Ouyang, New Taipei (TW); Wei-Cheng Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/701,459

(22) Filed: Dec. 3, 2019

(30) Foreign Application Priority Data

Nov. 6, 2019 (CN) ........................ 201911077813.X

(51) Int. Cl.
*G02F 1/1362* (2006.01)
*G09G 3/36* (2006.01)

(52) U.S. Cl.
CPC .. *G02F 1/136286* (2013.01); *G02F 1/136227* (2013.01); *G09G 3/3677* (2013.01); *G09G 3/3688* (2013.01); *G02F 1/136222* (2021.01); *G02F 2201/123* (2013.01)

(58) Field of Classification Search
CPC ................................................ G02F 1/136286
See application file for complete search history.

(56) References Cited

U.S. PATENT DOCUMENTS 10,490,620 B1 11/2019 Lai et al.
2020/0168691 A1* 5/2020 Choi .................... H01L 51/5275
2020/0192148 A1* 6/2020 Kim .................. G02F 1/133602

FOREIGN PATENT DOCUMENTS

CN 108878455 A 11/2018

* cited by examiner

*Primary Examiner* — Edmond C Lau
(74) *Attorney, Agent, or Firm* — ScienBiziP, P.C.

(57) ABSTRACT

A display area for displaying images and a camera area surrounded by the display area are both founded on an array substrate. The camera area defines a transparent area and a wire-routing area surrounding the transparent area. The array substrate includes first data lines, second data lines, and first scan lines. Each first data line, each second data line, and each first scan line avoid the transparent area and cross the wire-routing area. Each second data line includes an auxiliary data line and a data line lead. The first scan lines and the auxiliary data lines are defined by a first conductive layer, the first data lines and the data line leads are defined in a second conductive layer insulated and spaced from the first conductive layer, such a stacked arrangement allows an optically-clear path for the camera to collect light.

20 Claims, 9 Drawing Sheets

ARRAY SUBSTRATE, DISPLAY PANEL AND DISPLAY DEVICE

FIELD

The subject matter herein generally relates to displays, in particular, to an array substrate, a display panel using the array substrate, and a display device using the display panel.

BACKGROUND

Electronic devices such as mobile phones, tablets, and the like, have diverse functions, and often need to combine components for functions to be available. Electronic devices incorporating a camera have been widely produced and used.

An array substrate needs to be provided with a camera area in the camera is exposed. Plurality of wires and connections in the array may obstruct the camera. An improved arrangement of the wires of the array substrate not affecting the performance of the electronic device is desirable.

There is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
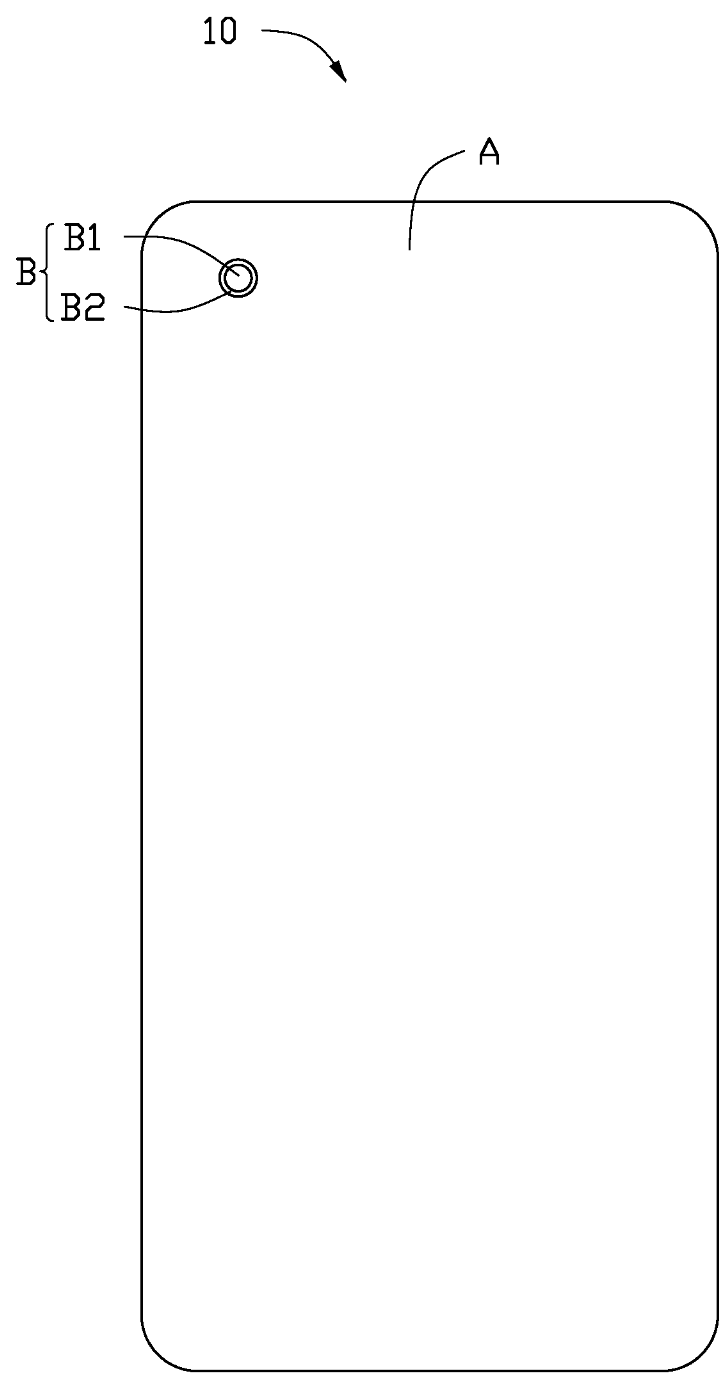
FIG. 1 is a top planar view of an array substrate according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

FIG. 1 shows an array substrate 10 according to an embodiment. The array substrate 10 defines a display area A and a camera area B surrounded by the display area A. The camera area B defines a transparent area B1 and a routing area B2 surrounding the transparent area B1. The camera area B allows light to pass through. The camera area B and the transparent area B1 are substantially circular, and the routing area B2 is annular. In other embodiments, the camera area B may have other shapes. For example, oval, polygonal, and the like.

Figure 2:
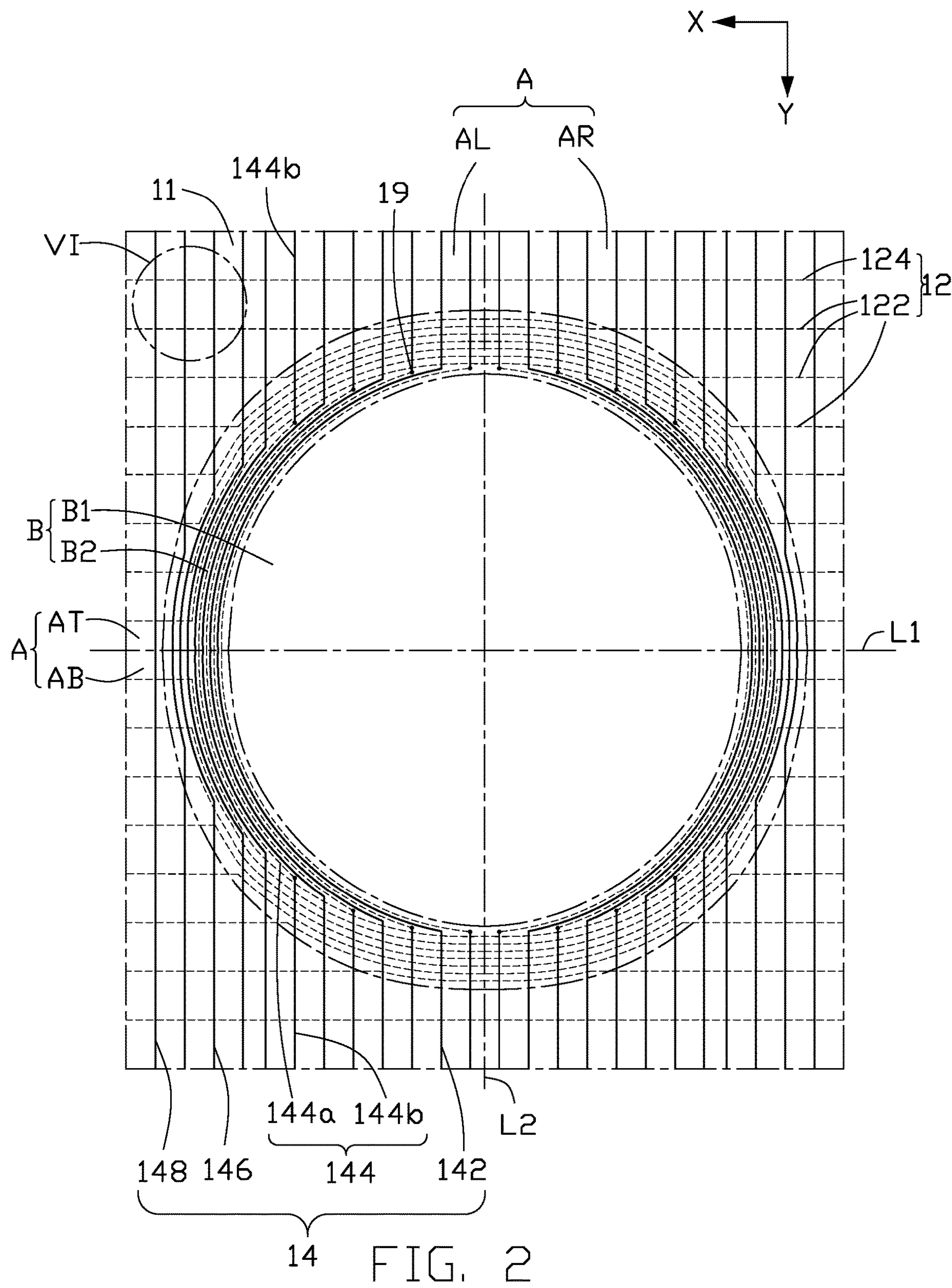
FIG. 2 is a schematic view showing an arrangement of wires of the array substrate of FIG. 1.

In FIG. 2, the routing area B2 has a first axis of symmetry L1 and a second axis of symmetry L2. In the first direction X, the routing area B2 is axially symmetrical with respect to the second axis of symmetry L2. In the second direction Y, the routing area B2 is axially symmetrical with respect to the first axis of symmetry L1. The second direction Y intersects with the first direction X. In the first direction X, the display area A is divided by the second axis of symmetry L2 into a left-side area AL and a right-side area AR, on opposite sides of the second axis of symmetry L2. In the second direction Y, the display area A is divided by the first axis of symmetry L1 into an upper-side area AT and a lower-side area AB, on opposite sides of the first axis of symmetry L1. That is, the left-side area AL and the right-side area AR constitute the entire display area A. The upper-side area AT and the lower-side area AB constitute the entire display area A. The left area AL has areas overlapping with the upper area AT and the lower area AB. The upper area AR has areas overlapping with upper area AT and the lower area AB. In one embodiment, the second direction Y is perpendicular to the first direction X.

In FIG. 2, the array substrate 10 includes a substrate 11 and scan lines 12 and data lines 14 on the substrate 11.

The scan lines 12 includes a plurality of first scan lines 122. The first scan lines 122 extend across the routing area B2 and are spaced apart from each other in the second direction Y. Some of the first scan lines 122 extend across the upper-side area AT and the routing area B2, and other first scan lines 122 extend across the lower-side area AB and the routing area B2. The first scan lines 122 are axially symmetrical with respect to the first axis of symmetry L1.

A portion of each first scan line 122 in the routing area B2 is axially symmetrical with respect to the second axis of symmetry L2. Each first scan line 122 extends in the first direction X to the routing area B2 in the left-side area AL, bends around the peripheral contour of the transparent area B1 in the routing area B2, and continues to extend in the first direction X in the right-side area AR. That is, each first scan line 122 bypasses the transparent area B1, crosses the routing area B2, and extends in the first direction X within the display area A. The first scan lines 122 in the upper-side area AT and the routing area B2 bend and extend along the upper half of the transparent area B1. The first scan lines 122 in the lower-side area AB and the routing area B2 bend and extend along the lower half of the transparent area B1.

Each first scan line 122 includes at least two straight portions and a curved portion. One straight portion of each first scan line 122 extends in the first direction X in the left-side area AL. The curved portion of each first scan line 122 extends around the peripheral contour of the transparent area B1 in the routing area B2 (this is an arc in FIG. 2). The other straight portion of each first scan line 122 extends in the first direction X in the right area AR. A length of the curved portion of the first scan line 122 varies with a distance of the first scan line 122 from the first axis of symmetry L1. The closer the first scan line 122 is to the first axis of symmetry L1, the longer is the length of the curved portion. The further the first scan line 122 is from the first axis of symmetry L1, the shorter is the length of the curved portion. In one embodiment, the first scan lines 122 are equally spaced apart from each other.

In FIG. 2, the data lines 14 includes first data lines 142 extending across the routing area B2. The first data lines 142 are spaced apart from each other in the first direction X. Some of the first data lines 142 extend in the left-side area AL and the routing area B2, and other first data lines 142 extend in the right-side area AR and the routing area B2. The first data lines 142 are axially symmetrical with respect to the second axis of symmetry L2.

A portion of each first data line 142 in the routing area B2 is axially symmetrical with respect to the first axis of symmetry L1. Each first data line 142 extends in the second direction Y to the routing area B2 in the upper-side area AT, bends around the peripheral contour of the transparent area B1 in the routing area B2, and continues to extend in the second direction Y in the lower-side area AB. That is, each first data line 142 bypasses the transparent area B1, crosses the routing area B2, and extends in the second direction Y within the display area A. The first data lines 142 are in the left-side area AL and the routing area B2 and extend along the left half of the transparent area B1. The first data lines 142 in the right-side area AR and the routing area B2 bend and extend in the right half of the transparent area B1.

Each first data line 142 includes at least two straight portions and a curved portion. One straight portion of each first data line 142 extends in the second direction Y in the upper-side area AT. The curved portion of each first data line 142 extends around the peripheral contour of the transparent area B1 in the routing area B2 (this is an arc in FIG. 2). The other straight portion of each first data line 142 extends in the second direction Y in the lower-side area AB. A length of the curved portion of each first data line 142 varies with a distance of the first data line 142 from the second axis of symmetry L2. The closer the first data line 142 is to the second axis of symmetry L2, the longer is the length of the curved portion. The further the first data line 142 is from the first axis of symmetry L1, the shorter is the length of the curved portion. In one embodiment, the first data lines 142 are equally spaced apart from each other.

In FIG. 2, the data lines 14 further include second data lines 144. The second data lines 144 extend across the routing area B2. Some of the second data lines 144 extend in the left-side area AL and the routing area B2, and other second data lines 144 extend in the right-side area AR and the routing area B2. The second data lines 144 are axially symmetrical with respect to the second axis of symmetry L2. The first data lines 142 and the second data lines 144 are alternately arranged along the first direction X. In the first direction X, each second data line 144 alternates with one first data line 142.

Each second data line 144 extends in the second direction Y to the routing area B2 in the upper-side area AT, bends around the peripheral contour of the transparent area B1 in the routing area B2, and continues to extend in the second direction Y in the lower-side area AB. That is, each second data line 144 bypasses the transparent area B1, crosses the routing area B2, and extends in the second direction Y in the display area A. The second data lines 144 in the left-side area AL and the routing area B2 bend and extend along the left half of the transparent area B1. The second data lines 144 in the right-side area AR and the routing area B2 bend and extend in right half of the transparent area B1.

Each second data line 144 includes at least two straight portions and a curved portion. One straight portion of each second data line 144 extends in the second direction Y in the upper-side area AT. The curved portion of each second data line 144 extends around the peripheral contour of the transparent area B1 in the routing area B2 (this is an arc in FIG. 2). The other straight portion of each second data line 144 extends in the second direction Y in the lower-side area AB.

The curved portion of each second data line 144 is defined as an auxiliary data line 144*a*. Each auxiliary data line 144*a* is axially symmetrical with respect to the first axis of symmetry L1. Each first data line 142 is between two adjacent auxiliary data lines 144*a*, and one auxiliary data line 144*a* is arranged between two adjacent first data lines 142. The auxiliary data lines 144*a* and the curved portions of the first data lines 142 are alternately arranged in the first direction X. In the first direction X, each auxiliary data line 144*a* alternates with one first data line 142. A length of the auxiliary data line 144*a* varies with a distance of of the auxiliary data line 144*a* from the second axis of symmetry L2. The closer the auxiliary data line 144*a* is to the second axis of symmetry L2, the longer is the length of the auxiliary data line 144*a*. The further the auxiliary data line 144*a* is to the second axis of symmetry L2, the shorter is the length of the auxiliary data line 144*a*.

The straight portion of each second data line 144 is defined as a data line lead 144*b*. The data line leads 144*b* and the straight portions of the first data lines 142 are alternately arranged in the first direction X. In the second direction Y, the first scan lines 122 are on a side of the auxiliary data lines 144*a* away from the transparent area B1. A projection of each data line leads 144*b* along a normal direction of the substrate 11 on the substrate 11 overlaps with all of the first scan lines 122.

Figure 3:
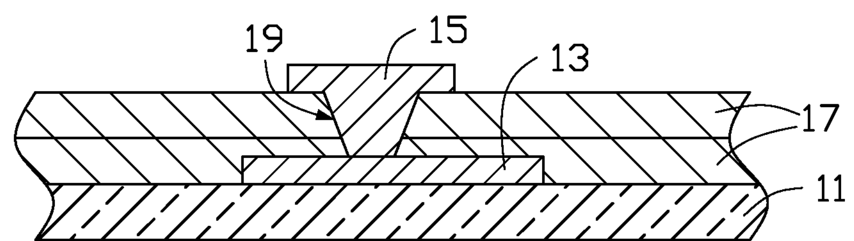
FIG. 3 is a cross-sectional view of the array substrate showing an auxiliary data line and a data line lead of FIG. 2 at a connection position.

As FIG. 3 shows, the array substrate 10 includes a substrate 11, a first conductive layer 13, a second conductive layer 15, and an insulating layer 17. The first conductive layer 13 is on a surface of the substrate 11. The insulating layer 17 is on the first conductive layer 13 between the first conductive layer 13 and the second conductive layer 15. The second conductive layer 15 is on the insulating layer 17. The insulating layer 17 is electrically insulated and may be made of a silicon oxide (SiOx) layer, a silicon nitride (SiNx) layer, or multiple layers including the silicon oxide (SiOx) layer and the silicon nitride (SiNx) layer.

The first scan lines 122 and the auxiliary data lines 144*a* are defined by the first conductive layer 13. The first data lines 142 and the data line leads 144*b* are defined by the second conductive layer 15. The second conductive layer 15 is insulated from and spaced apart from the first conductive layer 13. Each auxiliary data line 144*a* is electrically connected to one data line lead 144*b* by a via 19. That is, the auxiliary data lines 144*a* and the first data lines 142 are in different conductive layers. The projection of each first data line 142 along a normal direction of the substrate 11 on the substrate 11 is between two adjacent auxiliary data lines 144*a*, and the two adjacent first data lines 142 have one auxiliary data line 144*a* therebetween. Unlike the adjacent wires (e.g., the first and the second data lines) being in different conductive layers, the adjacent wires in the routing area B2 (e. g., the first data lines 142 and the auxiliary data lines 144*a*) in the present disclosure are in the same conductive layer. This allows a denser arrangement of wires without risk of short circuit, which is advantageous for reducing an area of the routing area B2.

As FIG. 2 shows, the data lines 14 further include third data lines 146. The third data lines 146 extend across the routing area B2 and are on a side of the first data lines 142 and the second data lines 144 away from the transparent area B1. The third data lines 146 are sequentially spaced apart in the first direction X. Some of the third data line 146 extend in the left-side area AL and the routing area B2, and the others extend in the right-side area AR and the routing area B2. The third data lines 146 are axially symmetrical with respect to the second axis of symmetry L2.

A portion of each third data line 146 in the routing area B2 is axially symmetrical with respect to the first axis of symmetry L1. Each third data line 146 extends in the second direction Y to the routing area B2 in the upper-side area AT, extends in the routing area B2 around the peripheral contour of the transparent area B1, and continues to extend in the second direction Y in the lower-side area AB. That is, each third data line 146 bypasses the transparent area B1, crosses the routing area B2, and extends in the display area A in the second direction Y. The first data lines 142 in the left-side area AL and the routing area B2 bend and extend along the left half of the transparent area B1. The first data lines 142 in the right-side area AR and the routing area B2 bend and extend along the right half of the transparent area B1.

Each third data line 146 includes at least two straight portions and a curved portion. One straight portion of each third data line 146 extends in the second direction Y in the upper-side area AT. The curved portion of each third data line 146 extends around the peripheral contour of the transparent area B1 in the routing area B2 (this is an arc in FIG. 2). The other straight portion of each third data line 146 extends in the second direction Yin the lower-side area AB. A length of the curved portion of the third data line 146 varies with a distance of the third data line 146 from the second axis of symmetry L2. The closer the third data line 146 is to the second axis of symmetry L2, the longer is the length of the curved portion. The further the third data line 146 is from the first axis of symmetry L1, the shorter is the length of the curved portion. In one embodiment, the third data lines 146 are equally spaced apart from each other.

In FIG. 2, the data lines 14 extending across the routing area B2 include the first, the second, and the third data lines 142, 144, and 146. In the first direction X, the arrangement of the data lines 14 in the routing area B2 is that the third data lines 146 (near the left area AL), and the second data lines 144 alternate with the first data lines 142 and the third data lines 146 (near the right-side area AR). The data lines 14 closest to the transparent area B1 may be the first data lines 142 or the second data lines 144.

In one embodiment, the third data lines 146 are defined by the second conductive layer 15. That is, the first data lines 142, the data line leads 144*b* of the second data lines 144, and the third data lines 146 are defined in the same conductive layer. The auxiliary data lines 144*a* of the second data lines 144 are formed by the first conductive layer 13. In one embodiment, the second data lines 144 are adjacent to the third data lines 146. In the data lines 14 extending across the routing area B2, adjacent data lines 14 of different types are in different conductive layers, so that the arrangement of the wires is denser without causing short circuits, and a difference between the inner and outer diameters of the routing area B2 is further reduced.

Referring to FIG. 2, the data lines 14 further include fourth data lines 148 in the display area A. The fourth data lines 148 extend only within the display area A and do not extend to the routing area B2. Some of the fourth data lines 148 are in the left-side area AL, and the others are in the right-side area AR. In the left-side area AL, the fourth data lines 148 are spaced apart from each other, and each fourth data line 148 extends in the second direction Y. In the right area AR, the fourth data lines 148 are spaced apart from each other, and each fourth data line 148 extends in the second direction Y. In the lower-side area AB (or in the upper-side area AT), in the first direction X, the arrangement of the first, the second, the third, and the fourth data lines 142, 144, 146, and 148 is that the fourth data lines 148, the third data lines 146, the first data lines 142 alternate with the second data lines 144 and the third and fourth data lines 146 and 148.

In one embodiment, in the lower-side area AB (or in the upper-side area AT), in the first direction X, the first to fourth data lines, 142 to 148, are equally spaced apart from each other. That is, in the lower-side area AB (or in the upper-side area AT), in the first direction X, pitch between any adjacent two fourth data lines 148, a pitch between any two adjacent third data lines 146, a pitch between the fourth data line 148 and the adjacent third data line 146, a pitch between the third data line 146 and the adjacent data line lead 144*b*, and a pitch between the data line lead 144*b* and the adjacent first data line 142 are all one distance and are equal.

Referring to FIG. 2, the scan lines 12 further includes second scan lines 124 only in the display area A. The second scan lines 124 extend only in the display area A and do not extend to the routing area B2. Some of the second scan lines 124 are in the upper-side area AT, and the other second scan lines 124 are in the lower-side area AB. In the upper-side area AT, the second scan lines 124 are spaced apart from each other, and each second scan line 124 extends in the first direction X. In the lower-side area AB, the second scan lines 124 are spaced apart from each other, and each second scan line 124 extends in the first direction X. In the second direction Y, the first and the second scan lines 122 and 124 are arranged so that the second scan lines 124 are in the upper-side area AT, the first scan lines 122 are in the upper-side area AT, the first scan lines 122 are in the lower-side area AB, and the second scan lines 124 are in the lower-side area AB.

In one embodiment, in the left area AL (or in the right area AR), in the second direction Y, there is one constant pitch between any two adjacent second scan lines 124, between any two adjacent first scan lines 122, and between the second scan line 124 and the adjacent first scan line 122.

In one embodiment, the second scan lines 124 are defined by the first conductive layer 13, the fourth data lines 148 are defined by the second conductive layer 15. That is, the first conductive layer 13 defines the auxiliary data lines 144*a*, the first, and the second scan lines 122 and 124. The second conductive layer 15 defines the first, the third, and the fourth data lines 142, 146, and 148, and the data line leads 144*b*. That is, all of the scan lines 12 (the first and the second scan lines 122 and 124) are formed in the first conductive layer 13. The data lines 14 (the first, the second, the third, and the fourth data lines 142, 144, 146, and 148) excluding the auxiliary data lines 144*a* are formed in the second conductive layer 15.

Figure 4:
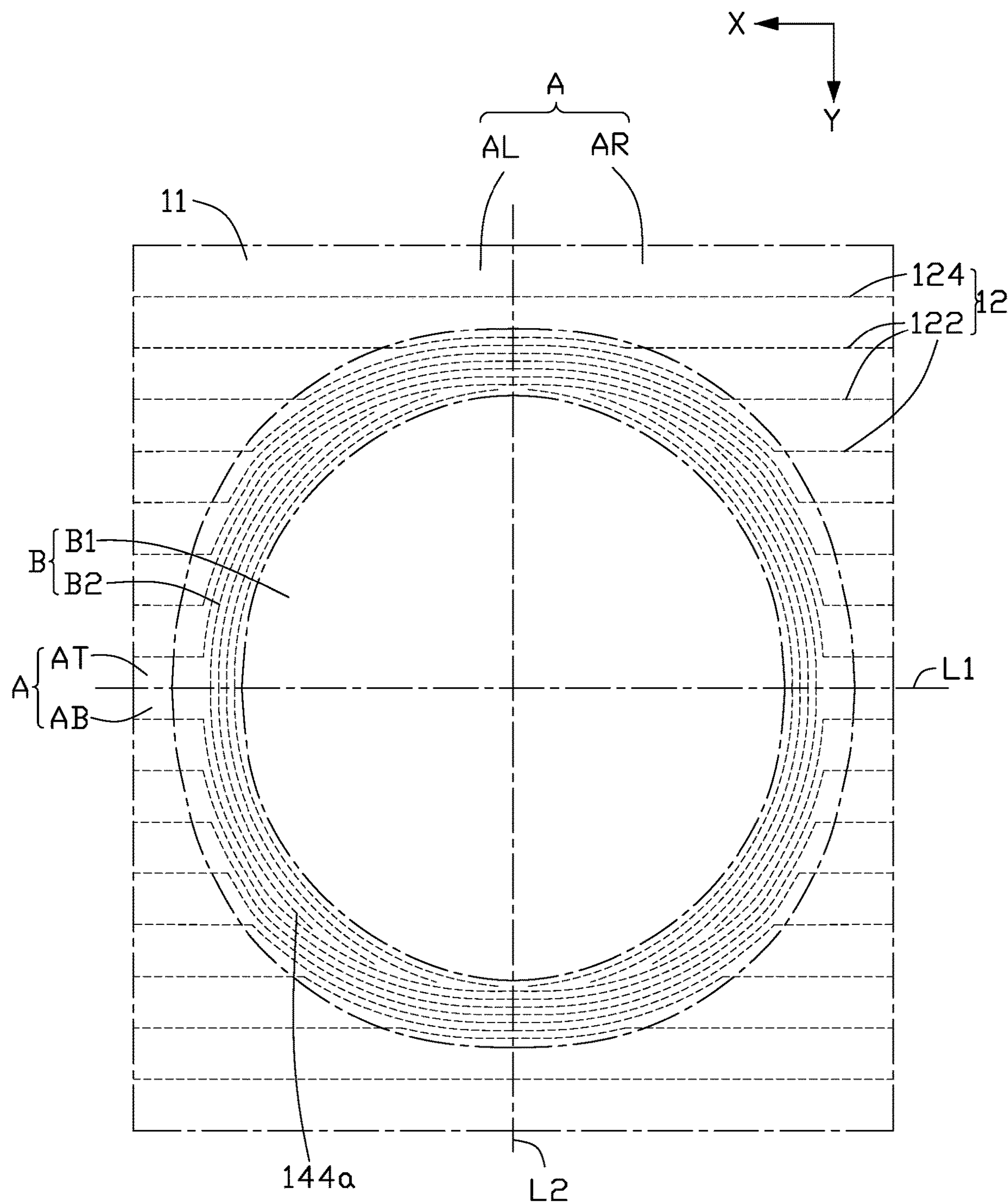
FIG. 4 is a schematic view of the substrate showing projections of first scan lines, auxiliary data lines, and second scan lines along a normal direction of the substrate.

FIG. 4 is a schematic view showing projections of the wires (the first and the second scan lines 122 and 124, and the auxiliary data lines 144*a*) defined by the first conductive layer 13 along a normal direction of the substrate 11 on the substrate 11. In FIG. 4, the first scan lines 122, the second scan lines 124, and the auxiliary data lines 144*a* are spaced apart. The auxiliary data lines 144*a* extend only in the routing area B2. The first scan lines 122 extend in the display area A and the routing area B2. The second scan lines 124 extend only in the display area A. Each auxiliary data line 144*a* is a curved segment extending around the transparent area B1. Each first scan line 122 includes a straight portion extending in the display area A and a curved portion extending in the line area B2. Each second scan line 124 extends in the first direction X in the display area A.

Figure 5:
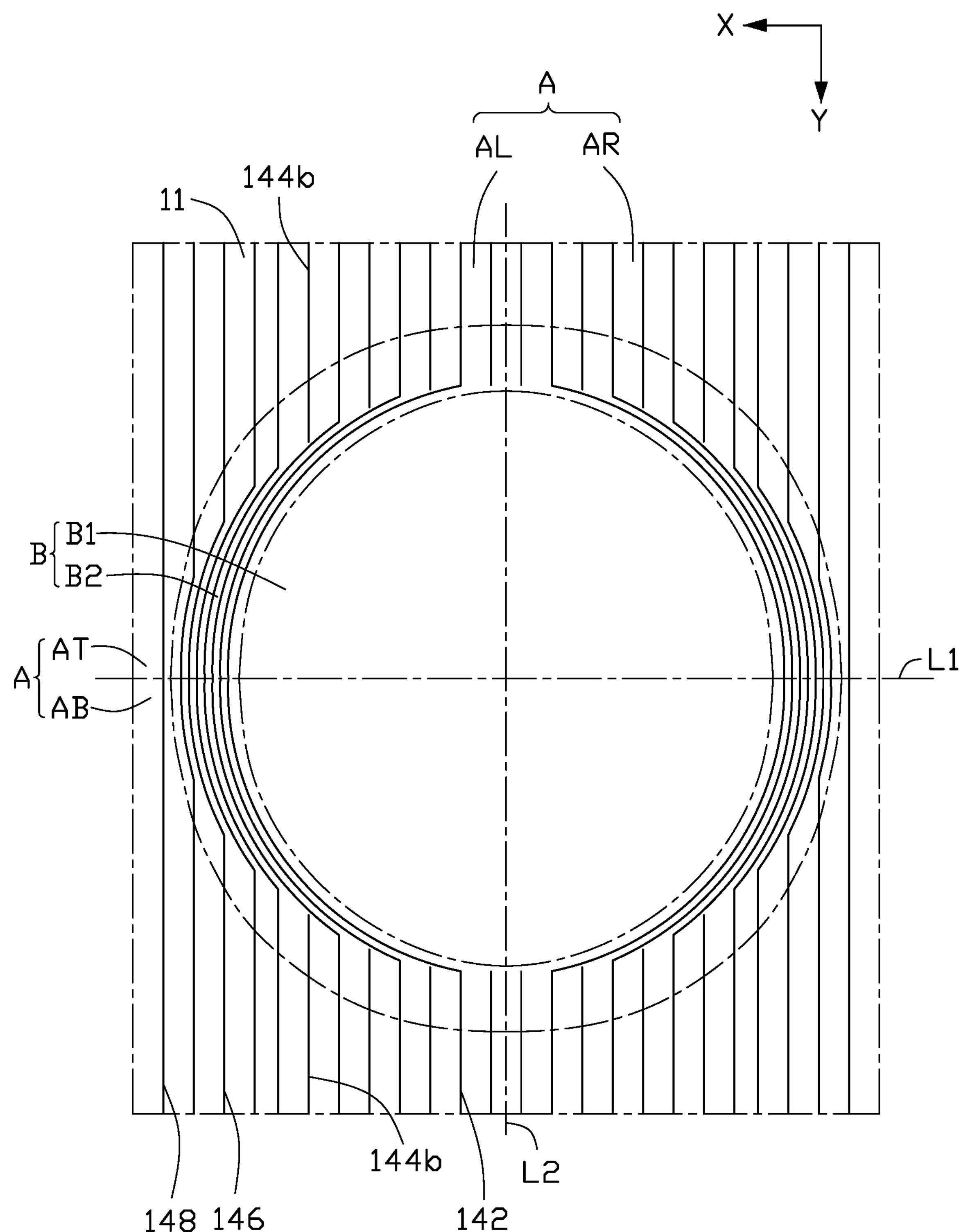
FIG. 5 is a schematic view showing projections of first data lines, data line leads, third data lines, and fourth data lines along a normal direction of the substrate on the substrate in FIG. 2.

FIG. 5 is a schematic view showing projections of the wires (the first, the third, and the fourth data lines 142, 146, and 148, and the data line leads 144*b*) defined by the second conductive layer 15 along a normal direction of the substrate 11 on the substrate 11. In FIG. 5, the first, the third, and the fourth data lines 142, 146, and 148, and the data line leads 144*b* are spaced apart from each other. The first data lines 142, the data line leads 144*b*, and the third data lines 146 extend in the display area A and the routing area B2. The fourth data lines 148 extend within the display area A. Each first data line 142 and each third data line 146 includes a straight portion extending in the display area A and a curved portion extending in the line area B2. Each data line lead 144*b* and each fourth data line 148 extends in the second direction Y.

In one embodiment, a ratio between scan lines 12 and data lines 14 extending across the routing area B2 is about 1:3. That is, a number of the first scan lines 122 is defined as N±2 (N is an integer greater than or equal to 3), and a sum of numbers of the first, the second, and the third data lines 142, 144, and 146 is 3 N±2. In one embodiment, the number of the first scan lines 122, the first data lines 142, the auxiliary data lines 144*a* and the third data lines 146 is N±2, and the number of data line leads 144*b* is 2 N±4. The auxiliary data lines 144*a* (N±2) formed in the first conductive layer 13 are electrically connected to the data line leads 144*b* (2 N±4) formed by the second conductive layer 15.

Since different wires (e. g., the first data lines 142 and the auxiliary data lines 144*a*, the third data lines 146 and the auxiliary data lines 144*a*) are formed in different conductive layers, adjacent wires can thus be arranged more densely without short circuits, which is advantageous for narrowing the design of the routing area B2. In addition, the auxiliary data lines 144*a* are closer to the transparent area B1 than the first scan lines 122 using the same conductive layer, and do not affect the wiring of the first scan lines 122.

Referring again to FIG. 2, none of the scan lines 12 and all the data lines 14 trespass in the camera area B, allowing light to pass through the camera area B without obstruction. A portion of each first scan line 122, each first data line 142, each second data line 144, and each third data line 146 form a ring shape surrounding the transparent area B1. All the scan lines 12 (the first and the second scan line 122 and 124) extend in the first direction X in the display area A, and all the data lines 14 (the first, the second, the third data and the fourth data lines 142, 144, 146 and 148) in the display area A extend in the second direction Y. The projection of each first data line 142, each second data line 144, each third data line 146, and each fourth data line 148 along a normal direction of the substrate 11 on the substrate 11 overlaps with all of the first and second scan lines 122 and 124.

Figure 6:
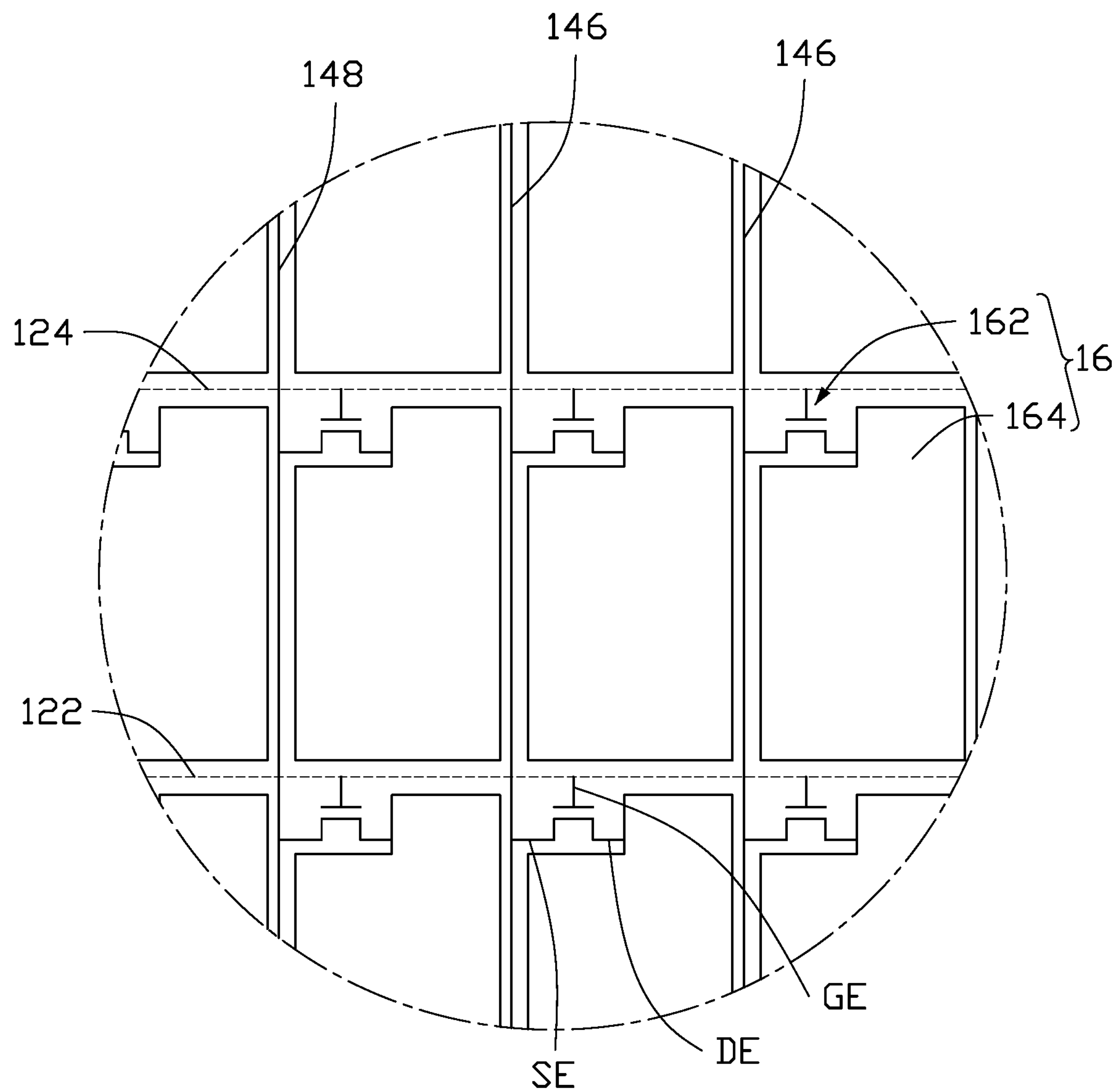
FIG. 6 is an enlarged view of portion VI of FIG. 2.

In one embodiment, images are not displayed in the camera area B. Any two adjacent first and second scan lines 122 and 124 and any two adjacent lines of the first, second, third, and fourth data lines 142, 144, 146, and 148 intersect in the display area A and thereby define one sub-pixel 16. As shown in FIGS. 2 and 6, each sub-pixel 16 includes a thin film transistor (TFT) 162 and a pixel electrode 164. The TFT 162 includes a gate electrode GE, a source electrode SE, and a drain electrode DE. The gate electrode GE is electrically connected to one of the first and the second scan lines 122 and 124. The source electrode SE is electrically connected to one of the first, the second, the third, and the fourth data lines 142, 144, 146, and 148. The drain electrode DE is electrically connected to the pixel electrode 164 in one sub-pixel 16.

It can be understood that although the arrangement of the scan lines 12 and the data lines 14 on the array substrate 10 is exemplarily described in this disclosure, in other embodiments, it can be an arrangement of other wires (e.g., touch wires) on the array substrate 10 defining the camera area.

In one embodiment, the substrate 11 is made of a transparent hard material, such as glass, quartz, or plastic. In other embodiments, the substrate 11 can be made of a flexible material, such as one or more of polyethersulfone (PES), polyethylene naphthalate (PEN), polyethylene (PE), polyimide (PI), polyvinyl chloride (PVC) and polyethylene terephthalate (PET). The first and the second conductive layer 13 and 15 are made of at least one selected from the group consisting of aluminum (AL), silver (Ag), gold (Au), chromium (Cr), copper (Cu), indium (In), manganese (Mg), molybdenum (Mo), nickel (Ni), ruthenium (Ru), palladium (Pa), platinum (Pt), titanium (Ti), tungsten (W), and zinc (Zn). The insulating layer 17 may be made of silicon oxide (SiOx), silicon nitride (SiNx), and/or silicon oxynitride (SiOxNy).

Figure 7:
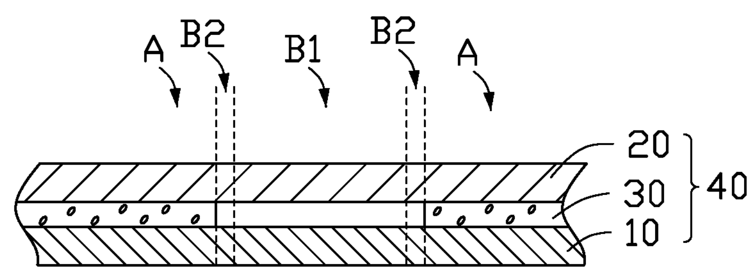
FIG. 7 is a cross-sectional view of a display panel according to an embodiment.

FIG. 7 shows a display panel 40 according to an embodiment. In FIG. 7, the display panel 40 includes the array substrate 10, a color filter substrate 20 opposite to the array substrate 10, and a liquid crystal layer 30 between the array substrate 10 and the color filter substrate 20. The color filter substrate 20 includes a transparent substrate (not shown), a black matrix (not shown) on a side of the transparent substrate close to the liquid crystal layer 30, a filter layer (not shown), and a protective layer (not shown). The black matrix, the filter layer, and the protective layer in the transparent area B1 of the camera area B are absent. That is, only the transparent substrate of the color filter substrate 20 remains in the transparent area B1. The liquid crystal layer 30 is in the display area A, and is not in the camera area B.

In other embodiments, the liquid crystal layer 30 may be in the camera area B. The array substrate 10 further includes a common electrode (not shown) in the display area A. The pixel electrodes 164 and the common electrode generate an electric field to rotate the liquid crystal molecules in the liquid crystal layer 30 for displaying images. The display area A and the camera area B do not display images.

Figure 8:
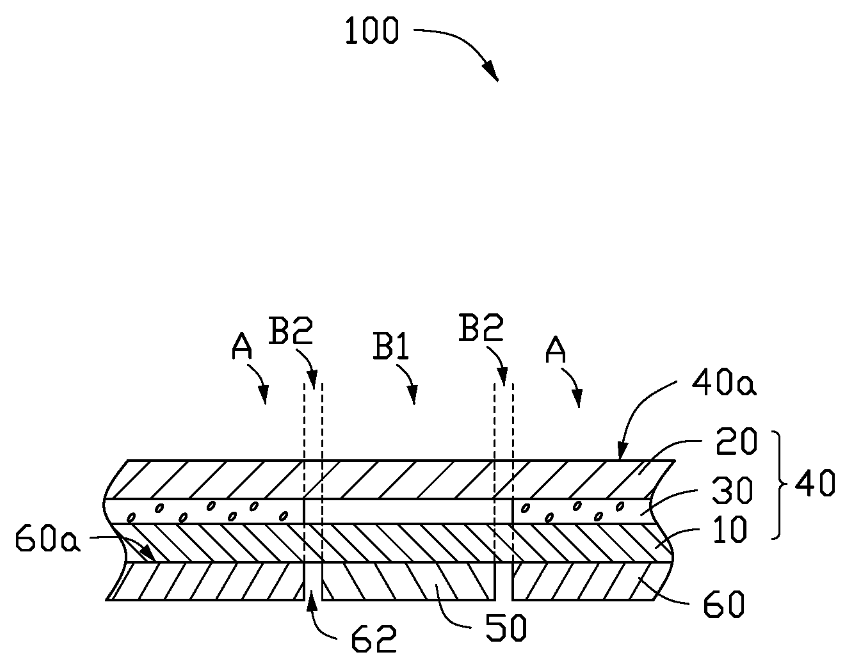
FIG. 8 is a cross-sectional view of a display device according to an embodiment.

FIG. 8 shows a display device 100 according to an embodiment. In FIG. 8, the display device 100 includes the display panel 40, a backlight module 60, and a camera 50. The backlight module 60 defines a light exiting side 60*a* from which light exits. The display panel 40 is on the light exiting side 60*a* of the backlight module 60. The display panel 40 has a display surface 40*a*. The camera 50 is on a side of the display panel 40 away from the display surface 40*a*. The camera 50 is in the camera area B to collect light through the camera area B.

The backlight module 60 is a direct type backlight. The backlight module 60 includes a light source (not shown), an optical film set (not shown), a back plate (not shown), and the like. The backlight module 60 defines a mounting hole 62 penetrating the backlight module 60 in the camera area B. A size of the mounting hole 62 is greater than or substantially equal to a size of the camera area B. The camera 50 is in the mounting hole 62. The camera 50 can be fixedly connected with the backlight module 60 in the mounting hole 62 by adhesive or other means.

Figure 9:
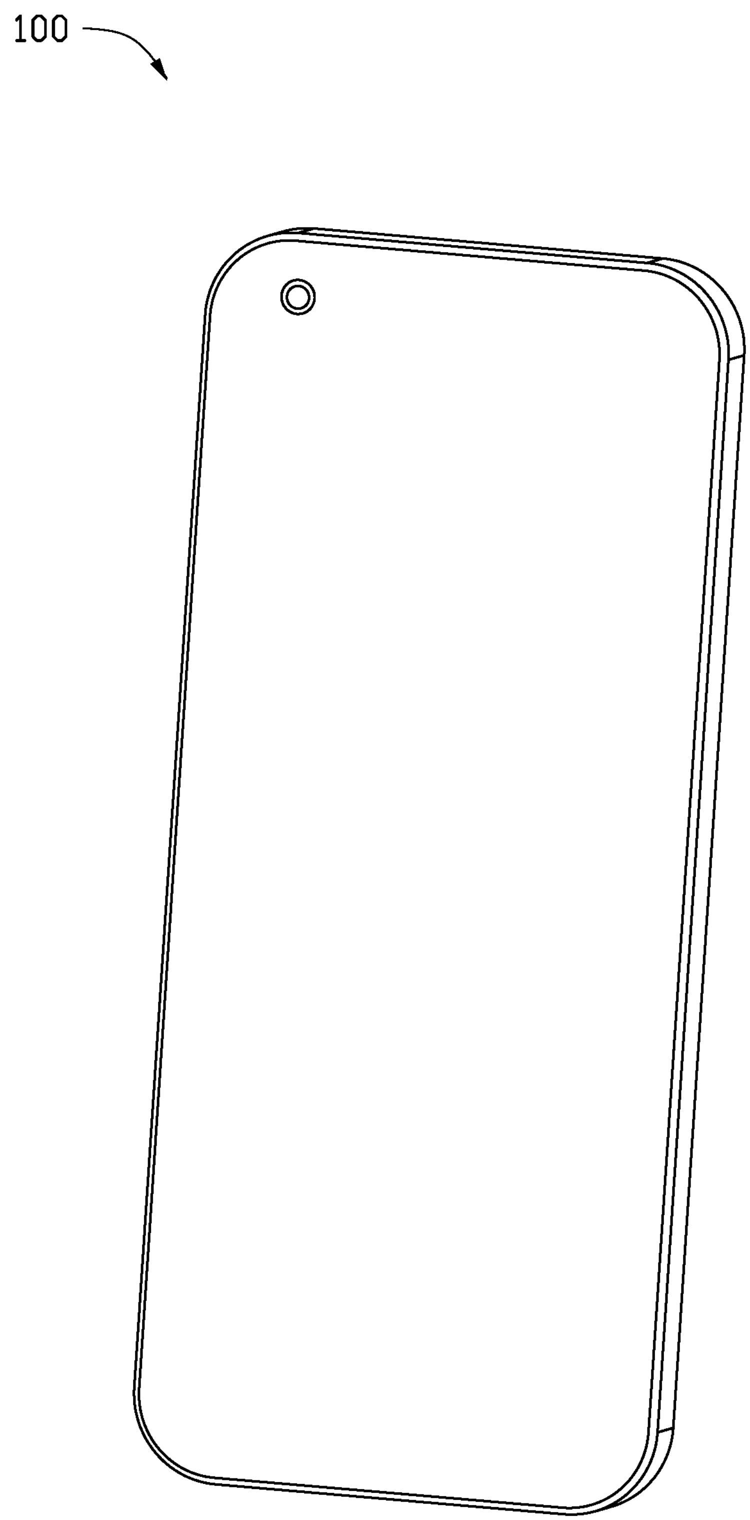
FIG. 9 is a perspective view of the display device shown in FIG. 8.

As the camera 50 is arranged in the camera area B surrounded by the display area A, light is collected through the camera area B as surrounded by the display area A, there is no need to open a through hole in border area of the display panel for placement of the camera. The border of the display device 100 can therefore be narrow or even non-existent, thereby increasing a screen-to-body ratio of the display device 100. In one embodiment, the display device 100 may be a mobile phone as shown in FIG. 9 or a display product having a camera 50 such as a tablet computer.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. An array substrate defining a display area and a camera area surrounded by the display area, the camera area defining a transparent area and a routing area surrounding the transparent area, the array substrate comprising:

a substrate;

a first conductive layer on the substrate; the first conductive layer comprising a plurality of first scan lines, each of the plurality of first scan lines bypassing the transparent area, crossing the routing area and extending in a first direction in the display area;

an insulating layer on the first conductive layer, the insulating layer being electrically insulated;

a second conductive layer on the insulating layer, the second conductive layer comprising a plurality of first data lines, each of the plurality of first data lines bypassing the transparent area, crossing the routing area, and extending in a second direction in the display area, the second direction intersecting with the first direction;

a plurality of second data lines on the substrate, each of the plurality of second data lines bypassing the transparent area, crossing the routing area, and extending in the second direction in the display area;

wherein each of the plurality of second data lines is alternatively arranged with one of the plurality of first data lines in the first direction;

each of the plurality of second data lines comprises an auxiliary data line and a data line lead coupled to the auxiliary data line, the auxiliary data line is in the routing area, the data line lead extends in the second direction in the routing area and the display area, the first conductive layer further comprises the auxiliary data line, and the second conductive layer further comprises the data line lead.

2. The array substrate according to claim 1, wherein a projection of each of the plurality of first data lines along a normal direction of the substrate on the substrate is between two adjacent auxiliary data lines, and each auxiliary data line is arranged between two adjacent of the plurality of first data lines.

3. The array substrate according to claim 1, wherein in the second direction, the plurality of first scan lines are at a side of the auxiliary data lines away from the transparent area;

a projection of each data line lead along a normal direction of the substrate on the substrate overlaps with all of the plurality of first scan lines.

4. The array substrate according to claim 1, wherein the second conductive layer further defines a plurality of third data lines;

each of the plurality of third data lines bypasses the transparent area, crosses the routing area, and extends in the second direction in the display area;

in the first direction, the plurality of third data lines are on a side of the plurality of first data lines and the plurality of second data lines away from the transparent area.

5. The array substrate according to claim 4, wherein the transparent area is circular, the routing area is annular, and each of the plurality of first scan lines and each of the plurality of first data lines, each of the plurality of second data lines, each of the plurality of third data lines comprises a curved portion extending around the transparent area.

6. The array substrate according to claim 4, wherein the first conductive layer further defines a plurality of second scan lines, and each of the plurality of second scan lines extends in the first direction in the display area;

the second conductive layer further defines a plurality of fourth data lines, each of the plurality of fourth data lines extends in the second direction in the display area.

7. The array substrate according to claim 6, wherein any two adjacent ones of the plurality of first scan lines, the plurality of second scan lines and any two adjacent ones of the plurality of first data lines, the plurality of second data lines, the plurality of third data lines and the plurality of fourth data lines intersect in the display area to define one sub-pixel;

the sub-pixel comprises a thin film transistor (TFT) and a pixel electrode;

the TFT comprises a gate electrode, a source electrode, and a drain electrode;

the gate electrode is electrically connected to one of the plurality of first scan lines and the plurality of second scan lines, and the source electrode is electrically connected to one of the plurality of first data lines, the plurality of second data lines, and the plurality of third data lines and the plurality of fourth data lines, the drain electrode is electrically connected to the pixel electrode.

8. A display panel comprising a color filter substrate, an array substrate, and a liquid crystal layer between the color filter substrate and the array substrate, the array substrate defining a display area and a camera area surrounded by the display area, the camera area defining a transparent area and a routing area surrounding the transparent area, the array substrate comprising:

a substrate;

a first conductive layer on the substrate; the first conductive layer comprising a plurality of first scan lines, each of the plurality of first scan lines bypassing the transparent area, crossing the routing area and extending in a first direction in the display area;

an insulating layer on the first conductive layer, the insulating layer being electrically insulated;

a second conductive layer on the insulating layer, the second conductive layer comprising a plurality of first data lines and a plurality of data line leads, each of the plurality of first data lines bypassing the transparent area, crossing the routing area, and extending in a second direction in the display area, the second direction intersecting with the first direction;

a plurality of second data lines on the substrate, each of the plurality of second data lines bypassing the transparent area, crossing the routing area, and extending in the second direction in the display area;

wherein each of the plurality of second data lines is alternatively arranged with one of the plurality of first data lines in the first direction;

each of the plurality of second data lines comprises an auxiliary data line and a data line lead coupled to the auxiliary data line, the auxiliary data line is in the routing area, the data line lead extends in the second direction in the routing area and the display area, the first conductive layer further comprises the auxiliary data line, and the second conductive layer further comprises the data line lead.

9. The display panel according to claim 8, wherein a projection of each of the plurality of first data lines along a normal direction of the substrate on the substrate is between two adjacent auxiliary data lines, and each auxiliary data line is arranged between two adjacent of the plurality of first data lines.

10. The display panel according to claim 8, wherein in the second direction, the plurality of first scan lines are at a side of the auxiliary data lines away from the transparent area;

a projection of each data line lead along a normal direction of the substrate on the substrate overlaps with all of the plurality of first scan lines.

11. The display panel according to claim 8, wherein the second conductive layer further defines a plurality of third data lines;

each of the plurality of third data lines bypasses the transparent area, crosses the routing area, and extends in the second direction in the display area;

in the first direction, the plurality of third data lines are on a side of the plurality of first data lines and the plurality of second data lines away from the transparent area.

12. The display panel according to claim 11, wherein the transparent area is circular, the routing area is annular, and each of the plurality of first scan lines and each of the plurality of first data lines, each of the plurality of second data lines, each of the plurality of third data lines comprises a curved portion extending around the transparent area.

13. The display panel according to claim 11, wherein the first conductive layer further defines a plurality of second scan lines, and each of the plurality of second scan lines extends in the first direction in the display area;

the second conductive layer further defines a plurality of fourth data lines, each of the plurality of fourth data lines extends in the second direction in the display area.

14. The display panel according to claim 13, wherein any two adjacent ones of the plurality of first scan lines, the plurality of second scan lines and any two adjacent ones of the plurality of first data lines, the plurality of second data lines, the plurality of third data lines and the plurality of fourth data lines intersect in the display area to define one sub-pixel;

the sub-pixel comprises a thin film transistor (TFT) and a pixel electrode;

the TFT comprises a gate electrode, a source electrode, and a drain electrode;

the gate electrode is electrically connected to one of the plurality of first scan lines and the plurality of second scan lines, and the source electrode is electrically connected to one of the plurality of first data lines, the plurality of second data lines, and the plurality of third data lines and the plurality of fourth data lines, the drain electrode is electrically connected to the pixel electrode.

15. A display device comprising:

a display panel comprising a color filter substrate, an array substrate, and a liquid crystal layer between the color filter substrate and the array substrate, the array substrate defining a display area and a camera area surrounded by the display area, the camera area defining a transparent area and a routing area surrounding the transparent area, the display panel comprising a display surface for displaying images; and a camera on a side of the display panel away from the display surface, the camera is in the camera area to collect image information through the camera area;

the array substrate comprising:

a substrate;

a first conductive layer on the substrate; the first conductive layer comprising a plurality of first scan lines, each of the plurality of first scan lines bypassing the transparent area, crossing the routing area and extending in a first direction in the display area;

an insulating layer on the first conductive layer, the insulating layer being electrically insulated;

a second conductive layer on the insulating layer, the second conductive layer comprising a plurality of first data lines, each of the plurality of first data lines bypassing the transparent area, crossing the routing area, and extending in a second direction in the display area, the second direction intersecting with the first direction;

a plurality of second data lines on the substrate, each of the plurality of second data lines bypassing the transparent area, crossing the routing area, and extending in the second direction in the display area;

wherein each of the plurality of second data lines is alternatively arranged with one of the plurality of first data lines in the first direction;

each of the plurality of second data lines comprises an auxiliary data line and a data line lead coupled to the auxiliary data line, the auxiliary data line is in the routing area, the data line lead extends in the second direction in the routing area and the display area, the first conductive layer further comprises the auxiliary data line, and the second conductive layer further comprises the data line lead.

16. The display device according to claim 15, further comprising a backlight module, wherein the display panel is on a side of the backlight module from which light exits, the backlight module defines a mounting hole extending through the backlight module, the mounting hole is in the camera area, and the camera is in the mounting hole.

17. The display device according to claim 16, wherein a projection of each of the plurality of first data lines along a normal direction of the substrate on the substrate is between two adjacent auxiliary data lines, and each auxiliary data line is arranged between two adjacent of the plurality of first data lines.

18. The display device according to claim 16, wherein in the second direction, the plurality of first scan lines are at a side of the auxiliary data lines away from the transparent area;

a projection of each data line lead along a normal direction of the substrate on the substrate overlaps with all of the plurality of first scan lines.

19. The display device according to claim 16, wherein the second conductive layer further defines a plurality of third data lines;

each of the plurality of third data lines bypasses the transparent area, crosses the routing area, and extends in the second direction in the display area;

in the first direction, the plurality of third data lines are on a side of the plurality of first data lines and the plurality of second data lines away from the transparent area.

20. The display device according to claim 16, wherein the transparent area is circular, the routing area is annular, and each of the plurality of first scan lines and each of the plurality of first data lines, each of the plurality of second data lines, each of the plurality of third data lines comprises a curved portion extending around the transparent area.

* * * * *